US008787905B2

(12) United States Patent
Zhu

(10) Patent No.: US 8,787,905 B2
(45) Date of Patent: Jul. 22, 2014

(54) METHOD AND CHECK NODE FOR LOCKING LOCATION OF USER NETWORK DEVICE

(75) Inventor: Li Zhu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,969

(22) PCT Filed: Jun. 28, 2010

(86) PCT No.: PCT/CN2010/074609
§ 371 (c)(1),
(2), (4) Date: Oct. 27, 2011

(87) PCT Pub. No.: WO2011/085579
PCT Pub. Date: Jul. 21, 2011

(65) Prior Publication Data
US 2012/0034932 A1 Feb. 9, 2012

(30) Foreign Application Priority Data
Jan. 14, 2010 (CN) .......................... 2010 1 0004088

(51) Int. Cl.
*H04W 8/04* (2009.01)
(52) U.S. Cl.
USPC ..................... 455/433; 455/456.1; 455/435.1; 455/456.2; 455/456.3
(58) Field of Classification Search
USPC .......................... 455/433, 456.1, 435.1, 435.2
See application file for complete search history.

(56) References Cited

U.S. PATENT DOCUMENTS

| 8,320,937 B2 * | 11/2012 | Bolin ........................ 455/456.1 |
| 2010/0062791 A1 * | 3/2010 | Wang et al. ................ 455/456.1 |
| 2011/0088086 A1 * | 4/2011 | Swink et al. ...................... 726/7 |

FOREIGN PATENT DOCUMENTS

| CN | 1710986 A | 12/2005 |
| CN | 1711782 A | 12/2005 |
| CN | 101626623 A | 1/2010 |

OTHER PUBLICATIONS

International Search Report for PCT/CN2010/074609 dated Sep. 28, 2010.

* cited by examiner

*Primary Examiner* — Allahyar Kasraian
*Assistant Examiner* — Farideh Madani
(74) *Attorney, Agent, or Firm* — Ling Wu; Stephen Yang; Ling and Yang Intellectual Property

(57) ABSTRACT

A method for locking a location of a Home NodeB (HNB) is provided, which includes: a Connectivity Session Location and Repository Function (CLF) and/or a verification node storing various location identifiers corresponding to location information; the user network device which includes a HNB or a Home evolved Home NodeB (HeNB) sending location information to the verification node after obtaining said location information; said verification node comparing received location information with the various location identifiers stored in the verification node and/or corresponding location identifiers inquired from the CLF, and determining whether to register the location information of said user network device according to a comparison and/or inquiry result. A verification node for giving support to locking a location of a user network device is further provided.

17 Claims, 4 Drawing Sheets

METHOD AND CHECK NODE FOR LOCKING LOCATION OF USER NETWORK DEVICE

TECHNICAL FIELD

The present invention relates to a technique of locking the location of the home NodeB in the wireless cellular communication system, and particularly, to a method for locking a location of a user network device and a verification node for giving support to locking a location of a user network device.

BACKGROUND OF THE RELATED ART

The Home NodeB (HNB) is used for providing the 3rd Generation (3G) wireless coverage in a home for User Equipment (UE) of the 3G. The HNB comprises the function of one standard NodeB (one element of the macro radio access network of the 3G) and the function of radio resource management of one standard Radio Network Controller (RNC).

FIG. 1 describes the system structure of the HNB, wherein the interface between the UE and the HNB of 3rd Generation Partnership Project (3GPP) is a backhaul and compatible air interface in the Universal Terrestrial Radio Access Network (UTRAN). The HNB accesses the operator's core network through a Security Gateway (SeGW), and the bandwidth Internet Protocol (IP) backhaul between the HNB and the SeGW is possibly insecure, and the information transmitted in this backhaul requires protecting by a secure channel established between the HNB and SeGW. The SeGW is on behalf of the operator's core network to carry out the mutual authentication with the HNB, and the HNB Gateway (HNB GW) and the SeGW are entities logically separated in the operator's core network for use in the access control of the UE of the non Closed Subscriber Group (CSG). The Operation Administration and Maintenance (OAM) is required to securely communicate.

FIG. 2 describes the system structure of the Home evolved NodeB (HeNB), and the difference between the system structures of the HeNB and HNB is that that HeNB connects the UE of the 3GPP with the air interface of the Evolved Universal Terrestrial Radio Access Network (EUTRAN).

The H(e)NB includes the HNB and HeNB, which is a common name of the HNB and the HeNB. Regarding the security of the H(e)NB, the 3GPP Technical Report (TR) 33.820 defines 27 types of threats, and these 27 types of threats are classified into 7 species, namely the hazard to the H(e)NB qualification certificate, the physical attack on the H(e)NB, the attack on the structure of the H(e)NB, the attack on the protocol of the H(e)NB, the attack on the core network, the attack on the data and identity privacy of the user, and the attack on the radio resources and management.

Wherein, the attack on the core network comprises the attack based on the location of the H(e)NB. The 3GPP TR 33.820 provides a scheme that the location locking mechanism overcomes the attack based on the location of the H(e)NB, and as shown in FIG. 3, this location locking mechanism mainly comprises following steps of:

step 301, the location register of the H(e)NB;

step 302, the location authentication of the H(e)NB.

However, in the practical application, regarding the universality and flexibility of the H(e)NB application, this location locking mechanism is quite faulty, and currently related specifications also do not provide any solution to locking the new location after moving the H(e)NB.

Since the H(e)NB is able to be moved, if the location of the H(e)NB is unable to be locked after moving the H(e)NB to a new location for various reasons, then the H(e)NB will not be reused. Thereby, the emergency call sent from this H(e)NB will not be reliably located, or not be sent to the correct emergency call centre; besides, the legal interception of the location report will become impossible.

In the existing H(e)NB location locking mechanism, one piece of location information only corresponds to one location identifier. However, in the practical application, the H(e)NB is likely to obtain various different types of location information at different times. Although the location of the H(e)NB is not moved, different types of location information will necessarily cause the failure of locking the location, and further cause that the H(e)NB is unable to be registered and used, which cries for one location which is able to pass the authentication of the various different types of location information.

Besides, in the current method for locking the H(e)NB location, besides the solution based on the IP address is required to obtain the location identifier from the Connectivity Session Location and Repository Function (CLF), solutions based on other location information all take the location information initially reported by the H(e)NB as the location identifier, which brings a series of security threats caused by the use in the illegal location, and since the H(e)NB is possibly located in an illegal location during the initial use, namely use in the unallowable use range, for example accessing the operators' networks irrelevant with the H(e)NB.

Thus it can be seen that it is required to propose a more perfect and effective scheme for implementing to lock the location of the H(e)NB so as to increase the reliability of locking the location of the H(e)NB and the locking success probability, and solve various inconveniences and threats caused by the location of the H(e)NB being moved.

SUMMARY OF THE INVENTION

In view of this, the main purpose of the present invention is to provide a method for locking a location of a user network device and a verification node for giving support to locking a location of a user network device so as to increase the reliability of locking the location of the home NodeB or home evolved NodeB and the locking success probability, and solve various inconveniences and threats caused by the location of the home NodeB or home evolved NodeB being moved.

In order to achieve the above purpose, the technical scheme of the present invention is implemented in this way:

the present invention provides a method for locking a location of a user network device, and this method comprises:

a Connectivity Session Location and Repository Function (CLF) and/or a verification node storing various location identifiers corresponding to location information;

when the user network device obtains location information, sending said location information to the verification node; and said verification node comparing received location information with the various location identifiers stored in the verification node and/or corresponding location identifiers inquired from the CLF, and determining whether to register the location information of said user network device according to a comparison and/or inquiry result;

wherein said user network device includes a Home NodeB (HNB) or a Home evolved NodeB (HeNB).

Said step of storing the various location identifiers corresponding to the location information comprises:

directly storing the various location identifiers corresponding to the location information in said CLF and/or verification node; or storing a location identifier group in said CLF and/or verification node after binding the various location identifiers corresponding to the location information of a same location as the location identifier group.

Said step of sending the location information to the verification node when the user network device obtains the location information comprises:

when said user network device initially obtains the location information, directly sending obtained location information to the verification node; or when said user network device re-obtains new location information, comparing said new location information with currently stored location information, and if both are consistent, not required to send the obtained location information to the verification node; if both are inconsistent, sending said new location information to the verification node.

Said step of said verification node comparing said received location information with the various location identifiers stored in the verification node and/or corresponding location identifiers inquired from the CLF, and determining whether to register the location information of said user network device according to the comparison and/or inquiry result comprises:

when both of the verification node and CLF store the location identifier of said user network device, said verification node comparing the received location information with the various location identifiers or the location identifier group stored in the verification node, and if the received location information is all able to match a corresponding location identifier in said verification node, then comparison succeeding and determining not to register the location information of the user network device; if the received location information is not all able to match the corresponding location identifier in said verification node, then comparison failing and sending a request for inquiring the corresponding location identifier to the CLF;

said CLF searching a database of its own, inquiring the location identifier or location identifier group corresponding to said location information, and if the corresponding location identifier or location identifier group exists in said database, then sending an inquired location identifier or location identifier group to said verification node, and said verification node re-registering the new location information of said user network device according to a received location identifier or location identifier group; if the corresponding location information does not exist in said database, then sending said location information to a network management centre; and said network management centre checking whether said location information is available, and if said location information is unavailable, refusing service access of said user network device; if said location information is available, then registering the location identifier or location identifier group based on said location information in the database of said CLF, and after binding said the location information with the location identifier or the location identifier group, sending it to the verification node.

Said step of said verification node comparing said received location information with the various location identifiers stored in the verification node, and determining whether to register the location information of said user network device according to the comparison and/or inquiry result comprises:

when only the verification node stores the location identifier of said user network device, said verification node comparing the received location information with the various location identifiers or a location identifier group stored in the verification node, and if the received location information is all able to match the corresponding location identifier in said verification node, then comparison succeeding and determining not to register the location information of said user network device; if the received location information is not all able to match the corresponding location identifier in said verification node, then the comparison failing and refusing service access of said user network device.

Said step of said verification node comparing said received location information with corresponding location identifiers inquired from the CLF, and determining whether to register the location information of said user network device according to the comparison and/or inquiry result comprises:

when only the CLF stores the location identifier of said user network device, said verification node directly sending the request for inquiring a corresponding location identifier to the CLF according to the received location information;

the CLF searching a database of its own, inquiring the location identifier or location identifier group corresponding to said location information, and if the corresponding location identifier or location identifier group exists in said database, then sending an inquired location identifier or location identifier group to said verification node, and said verification node re-registering new location information of said user network device according to a received location identifier or location identifier group; if the corresponding location information does not exist in said database, then sending said location information to a network management centre; and said network management centre checking whether said location information is available, and if said location information is unavailable, refusing service access of said user network device; if said location information is available, then registering the location identifier or location identifier group based on said location information in the database of said CLF, and after binding said the location information with the location identifier or location identifier group, sending it to the verification node.

This method further comprises: when the comparison of said verification node fails, said verification node cancelling or deleting a current location identifier or location identifier group of the user network device.

Before the step of said user network device sending the location information to the verification node, this method further comprises: said verification node learning that the location information of the user network device varies, cancelling or deleting a current location identifier or location identifier group of the H(e)NB.

Said verification node is a user network device management system and/or a user network device gateway; said user network device management system includes a Home NodeB Management System (HMS) or a Home evolved NodeB Management System (HeMS); and said user network device gateway includes a Home NodeB Gateway (HNB-GW) or a Home evolved NodeB Gateway (HeNB-GW).

The present invention further provides a system for locking a location of a Home NodeB, and this system comprises: a user network device, a verification node and a CLF, wherein said user network device is configured to: send location information to the verification node when obtaining said location information, wherein said user network device includes a Home NodeB (HNB) or a Home evolved Home NodeB (HeNB);

said verification node is configured to: compare said location information with various location identifiers previously stored in the verification node and/or inquire corresponding location identifiers from the CLF according to the location information, and determine whether to register the location information of said user network device according to a comparison and/or inquiry result;

said CLF is configured to: store the various location identifiers corresponding to the location information, and provide inquiry service of the location identifier corresponding to said location information.

Said CLF is further configured to: directly store the various location identifiers corresponding to the location information; or store a location identifier group after binding the various location identifiers corresponding to the location information of a same location as the location identifier group.

Said user network device is further configured to: when initially obtaining the location information, directly send obtained location information to the verification node;

when said user network device re-obtains new location information, compare said new location information with currently stored location information, and if both are consistent, not required to send the obtained location information to the verification node; if both are inconsistent, send said new location information to the verification node.

This system further comprises: a network management centre, said verification node is further configured to: compare the received location information with the various location identifiers or the location identifier group previously stored in the verification node according to the received location information, and if the received location information is all able to match a corresponding location identifier in said verification node, then comparison succeeds and determine not to register the location information of the user network device; or else, send a request for inquiring the corresponding location identifier to said CLF or refuse service access of said HeNB;

said verification node also directly sends the request for inquiring a corresponding location identifier to the CLF according to the received location information;

the CLF is further configured to: search a database of its own, and inquire the location identifier or location identifier group corresponding to said location information, and if the corresponding location identifier or location identifier group exists in said database, then send an inquired location identifier or location identifier group to said verification node, and said verification node re-registers new location information of said user network device according to a received location identifier or location identifier group; if the corresponding location information does not exist in said database, then send said location information to the network management centre;

said network management centre is configured to: check whether said location information is available, and if said location information is unavailable, refuse the service access of said user network device; if said location information is available, then register the location identifier or location identifier group based on said location information in the database of said CLF, and after binding said the location information with the location identifier or location identifier group, send it to the verification node.

Said verification node is further configured to: cancel or delete a current location identifier or location identifier group of the user network device when the comparison fails.

Said verification node is further configured to: before said user network device sends the location information to the verification node, cancel or delete the current location identifier or location identifier group of the user network device when learning that the location information of the user network device varies.

The present, invention further provides a verification node for giving support to locking a location of a user network device, which comprises:

a location information receiving module, which is configured to: receive location information sent by the user network device to the verification node after the user network device obtains said location information; and a comparing module, which is configured to: compare said location information received by said location information receiving module with various location identifier corresponding to said location information stored in the comparing module and/or corresponding location identifiers inquired from a Connectivity Session Location and Repository Function (CLF) which stores various location identifiers corresponding to the location information, and determine whether to register the location information of said user network device according to a comparison and/or inquiry result;

wherein said user network device includes a Home NodeB (HNB) or a Home evolved Home NodeB (HeNB).

Said comparing module is configured to store the various location identifiers corresponding to the location information in a following way:

directly storing the various location identifiers corresponding to the location information in said comparing module; or storing a location identifier group in said comparing module after binding the various location identifiers corresponding to the location information of a same location as the location identifier group.

Said comparing module is configured to compare said location information received by said location information receiving module with the various location identifier corresponding to said location information stored in the comparing module and/or the corresponding location identifiers inquired from a Connectivity Session Location and Repository Function (CLF) which stores the various location identifiers corresponding to the location information, and determine whether to register the location information of said user network device according to the comparison and/or inquiry result in a following way:

when both of the verification node and the CLF store the location identifier of said user network device, said comparing module comparing the received location information with the various location identifiers or the location identifier group stored in the verification node, and if the received location information is all able to match a corresponding location identifier in said verification node, then comparison succeeding and determining not to register the location information of the user network device; if the received location information is not all able to match the corresponding location identifier in said verification node, then comparison failing and sending a request for inquiring the corresponding location identifier to the CLF; or when only the verification node stores the location identifier of said user network device, said comparing module comparing the received location information with the various location identifiers or the location identifier group stored in the verification node, and if the received location information is all able to match the corresponding location identifier in said verification node, then the comparison succeeding and determining not to register the location information of said user network device; if the received location information is not all able to match the corresponding location identifier in said verification node, then the comparison failing and refusing service access of said user network device; or when only the CLF stores the location identifier of said user network device, said comparing module directly sending the request for inquiring the corresponding location identifier to the CLF according to the received location information so that said CLF searches a database of its own, and inquires the location identifier or location identifier group corresponding to said location information, and if the corresponding location identifier or location identifier group exists in said verification node, then sends an inquired location identifier or location identifier group to said verification node, and said verification node re-registers new location information of said user network device according to the received location identifier or location identifier group; if the corresponding location information does not exist in said database, then sends said location information to a network management centre; and said network management centre checks whether said location information is available, and if said location information is unavailable, refuses the service access of said user network device; if said location information is available, then registers the location identifier or location identifier group based on said location information in the database of said CLF, and sends it to the verification node after binding said the location information with the location identifier or location identifier group.

Said comparing module is further configured to: cancel or delete a current location identifier or location identifier group of a user network device when the comparison of said verification node fails.

Said comparing module is further configured to: cancel or delete the current location identifier or location identifier group of the user network device when said verification node learns that the location information of the user network device varies.

The method and system for locking a location of a home NodeB provided in the present invention implement to lock the location of the H(e)NB when the H(e)NB moves, which increases the reliability of locking the location of the H(e)NB and the locking success probability, and solves various inconveniences and threats caused by the location of the H(e)NB being moved.

PREFERRED EMBODIMENTS OF THE PRESENT INVENTION

Figure 1:
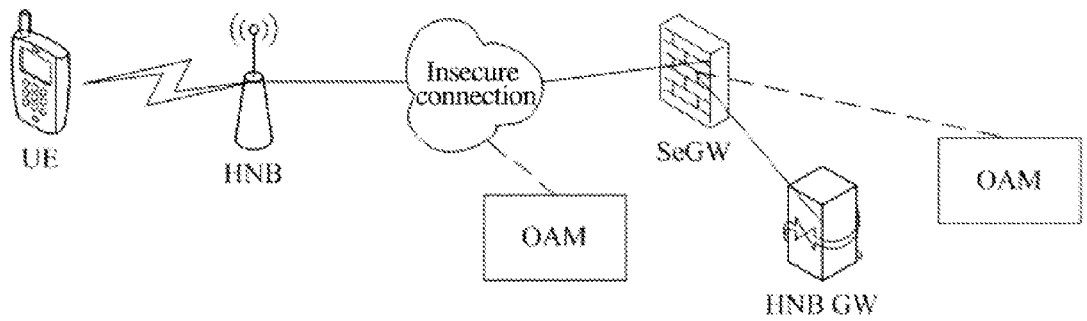
FIG. 1 is a schematic diagram of the system structure of the HNB in the related art.
Figure 2:
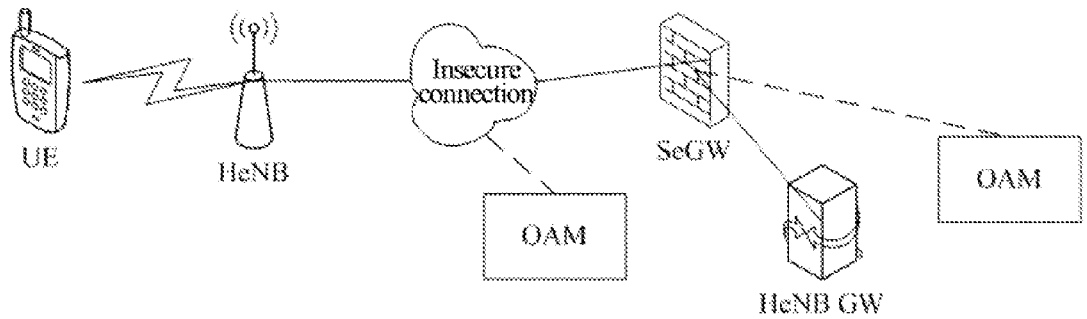
FIG. 2 is a schematic diagram of the system structure of the HeNB in the related art.
Figure 3:
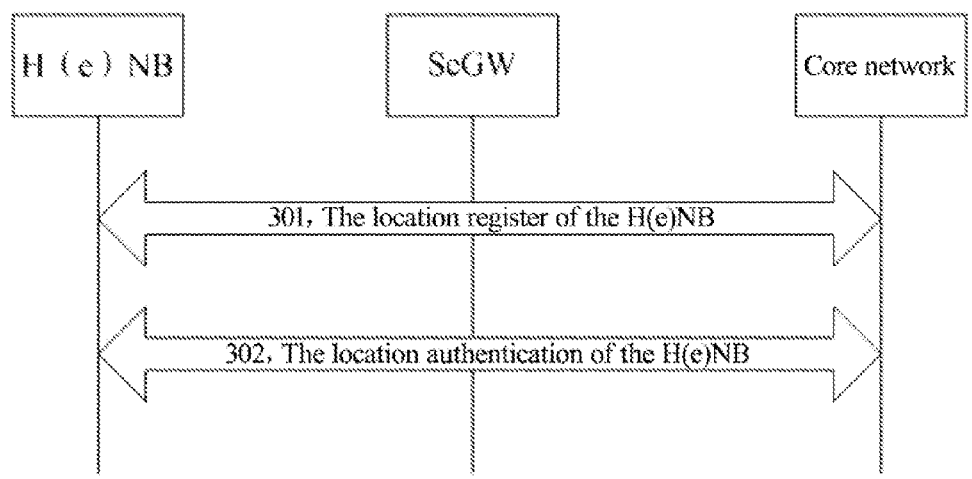
FIG. 3 is a flow chart of one location locking mechanism provided in the 3GPP TR 33.820.

Below it will further describe the technical scheme of the present invention in detail with reference to the figures and specific examples.

In order to implement to lock the location of the user network device (including the H(e)NB) when the user network device (including the H(e)NB) is moved, the present invention provides a method for locking the location of the user network device (including the H(e)NB), and its core concept is: the CLF and/or the verification node storing various location identifiers corresponding to location information; when the H(e)NB obtains the location information, sending the location information to the verification node; and the verification node comparing the location information in the request with the various location identifiers previously stored in the verification node and/or corresponding location identifiers inquired from the CLF, and determining whether to register the location information of the H(e)NB according a comparison and/or inquiry result.

In the practical application, the location information corresponding to the same one location usually has various forms, and each form of the location information is all corresponding to one location identifier. The common types of location information are such as: the IP address, the Neighbouring Macro-cells, the UE Information, and the location information obtained via the Assisted Global Positioning System (A-GPS) and so on. Therefore, there are two ways for CLF storing the location identifier: one is directly storing various location identifiers corresponding to the location information into the CLF, namely one type of location information corresponding to one location identifier; the other is storing a location identifier group into the CLF after binding various location identifiers corresponding to the location information (various types) of the same location as a location identifier group. It can be seen by comparing these two storage ways that the latter storage way is to bind corresponding relationships of the various location information of the same location and the location identifiers together based on the former storage way, and the bound location identifiers compose the location identifier group.

For the processing of sending the location information to the verification node when the H(e)NB obtains the location information, it is required to illustrate that following two cases exist:

1: if the H(e)NB initially obtains its location information, then the H(e)NB directly sends the obtained location information to the verification node;

2: if the H(e)NB re-obtains its new location information, then the H(e)NB can compare the new location information with the currently stored location information, and if both are consistent, there is no need to send the obtained location information to the verification node; if both are inconsistent, then send the new location information to the verification node.

Wherein the operation of comparing the new location information with the currently stored location information is optional, namely H(e)NB can carry out this comparison operation, or H(e)NB also can directly send the new location information to the verification node instead of carrying out the comparison.

Besides, the verification node is required to compare the received location information with the various location identifiers previously stored in the verification node and/or corresponding location identifiers inquired from the CLF according to the received location information after the H(e)NB sends the location information to the verification node, and determine whether to register the location information of the H(e)NB according to the comparison and/or inquiry result, specifically:

the verification node compares the received location information with various location identifiers or the location identifier group previously stored in the verification node and/or the corresponding location identifiers inquired from the CLF according to the received location information, and if the received location information is all able to match the corresponding location identifiers in the verification node, it determines not to register the location information of the H(e)NB; or else, sends a request for inquiring the corresponding location identifiers (this request only includes the location information which is not matched successfully) to the CLF or refuses the service access of said H(e)NB.

Besides, said verification node also directly sends the request for inquiring corresponding location identifiers to the CLF according to the received location information;

the CLF searches its own database, and inquires the location identifiers or the location identifier group corresponding to the location information in the request of the verification node, and if the corresponding location identifier or location identifier group exists in the database, then sends the inquired location identifiers or location identifier group to the verification node, and the verification node re-registers the new location information of H(e)NB according to the received location identifier or location identifier group; if the corresponding location information does not exist in the database, sends the location information to the network management centre;

the network management centre checks whether the location information is available, and if unavailable, then refuses the service access of the H(e)NB, and if available, then registers the location identifier or location identifier group based on the location information in the database of the CLF, and sends it to the verification node after binding the location information with the location identifier or location identifier group.

Preferably, when the comparison of the verification node fails, the verification node executes the cancellation or deletion of the current location identifier or location identifier group of the H(e)NB. Said deletion of the current location identifier or location identifier group of the H(e)NB refers to deleting the current location identifier or location identifier group of the corresponding H(e)NB in the verification node; said cancellation of the current location identifier or location identifier group of the H(e)NB refers to setting the current location identifier or location identifier group of the corresponding H(e)NB as unavailable, but still storing the location identifier or location identifier group for other uses, such as used for inquiring the history records used by the H(e)NB. The specific cancellation or deletion operations will be illustrated with examples later.

Besides, the verification node referred in the present invention is the H(e)MS and/or H(e)NB-GW, and also can be other network elements which are able to carry out the location verification and store the location identifier in the core network, wherein the H(e)MS refers to the H(e)NB management system, and the H(e)NB-GW refers to the H(e)NB gateway.

It should be pointed out that the verification node in the present invention not only can cancel or delete the current location identifier or location identifier group of H(e)NB after the H(e)NB sends location information to the verification node; but also can learn that the location of the H(e)NB varies before the H(e)NB sends the location information to the verification node, or execute operations of cancelling or deleting the current location identifier or location identifier group of the H(e)NB in the cases of learning that it is unable to communicate with the H(e)NB normally and so on. In the practical application, there is a plurality of ways for the verification node to learn that the location of the H(e)NB varies, for example, the verification node detects that the location of the H(e)NB varies via a detection mechanism of the verification node's own, or the H(e)NB actively notifies the verification node that the location of this H(e)NB varies when the location of H(e)NB varies. The present invention does not limit the specific implementation ways of the verification node learning that the location of the H(e)NB varies and the specific steps of the verification node cancelling or deleting the current location identifier or location identifier group of the H(e)NB.

Wherein one typical way of the verification node learning that the location of the H(e)NB varies is the H(e)NB initiating a request for triggering the cancellation or deletion of the location identifiers to the verification node; the verification node learning that the location of the H(e)NB varies according to the received request, and cancelling or deleting the current location identifier or location identifier group of this H(e)NB.

Figure 4:
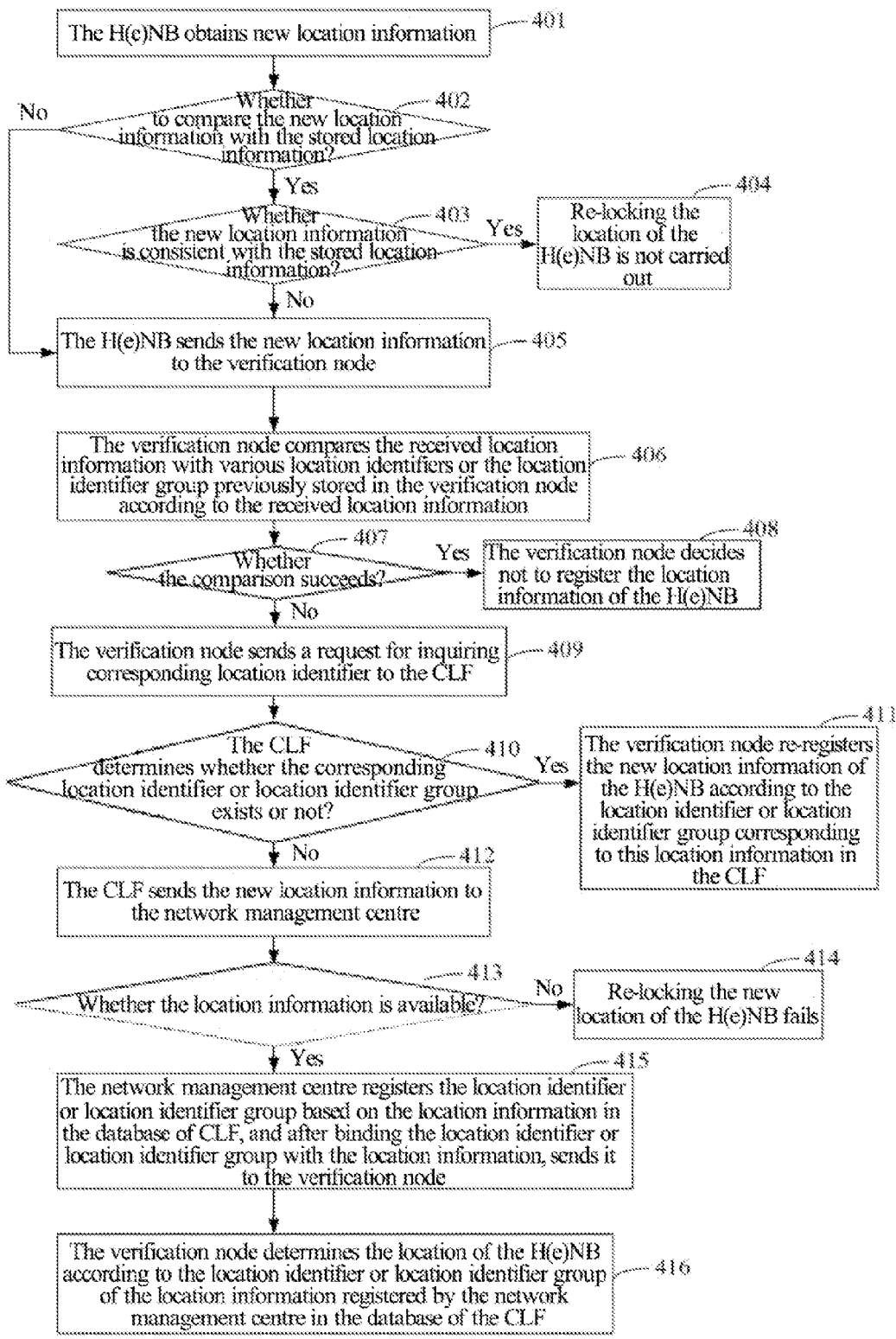
FIG. 4 is a flow chart of the method for locking the location of the H(e)NB when both of the verification node and the CLF store the location identifier of the H(e)NB according to the present invention.

Base on the above core concept of the present invention, below it will describe the specific operations of locking the location of the H(e)NB in detail. As shown in FIG. 4, this figure shows a flow of locking the location of the H(e)NB when both of the verification node and the CLF store the location identifier of the H(e)NB, and specifically comprises following steps:

Step 401, the H(e)NB obtains new location information.

Step 402, the H(e)NB chooses whether to compare the new location information with the current stored location information, and if yes, execute the step 403; if no, execute the step 405.

Step 403, the H(e)NB compares whether the new location information is consistent with the current stored location information, and if the result is the consistent, then execute the step 404; and if the result is the inconsistent, then execute the step 405.

Said inconsistency of the location information includes: the new location information inconsistent with the current stored location information which is caused by the location of the H(e)NB varying, and it also includes: the new location information inconsistent with the current stored location information which is caused by the type of the location information varying but the location of the H(e)NB not varying. Said the type of the location information varying is for example: the location information varies from the previous type of the IP address to the current type of the Macro Cell address.

Step 404, re-locking the location of the H(e)NB is not carried out, ending.

Step 405, the H(e)NB sends the new location information to the verification node.

Steps 406~407, the verification node compares the received location information with various location identifiers or the location identifier group previously stored in the verification node according to the received location information, and if the received location information is all able to match the corresponding location identifier in the verification node, execute the step 408; if the received location information is not all able to match the corresponding location identifier in the verification node, execute the step 409.

Step 408, the location information received by the verification node is all able to match the corresponding location identifier in the location identifiers or location identifier group stored in the verification node itself, and then the comparison succeeds, and it denotes that the location of the H(e)NB does not vary, and the verification node decides not to register the location information of the H(e)NB, ending.

Step 409, comparison fails, and the verification node sends a request for inquiring the corresponding location identifier to the CLF, and the request includes the location information which is not matched successfully.

Besides, when the comparison fails, the verification node also can execute the cancellation or deletion of the current location identifiers or location identifier group of the H(e)NB. For example, the new location information obtained by the H(e)NB includes A, B and C, then the verification node compares A, B and C with the location identifier or location identifier group stored by itself according to A, B and C, and if location information A and B are all able to match the corresponding location identifiers in the verification node successfully, but the location information C is unable to match the corresponding location identifier in the verification node, then the verification node sends the request for inquiring the location identifier corresponding to the location information C to the CLF. If the location identifier group stored by the verification node further includes the location identifier D, then the verification node cancels or deletes the location identifier D.

Step 410, the CLF searches its database, and inquires the location identifier or location identifier group corresponding to the received location information, and if the search result is existing, execute the step 411; if the search result is not existing, execute the step 412.

Step 411, the CLF sends the searched location identifier or location identifier group to the verification node, and the verification node re-registers the new location information of the H(e)NB according to the received location identifier or location identifier group, and the network permits the service access of the H(e)NB based on the new location information, and locking the new location of the H(e)NB succeeds, ending.

Step 412, the CLF sends the location information to the network management centre.

Step 413, the network management centre checks whether the location information is available after receiving the location information, and if it is unavailable, step 414 is carried out; if it is available, step 415 is carried out.

Step 414, the network management centre refuses the service access of the H(e)NB based on the location information, and sends the refusal reason to the H(e)NB, and locking the new location of the H(e)NB fails, ending.

Step 415, the network management centre registers the location identifier or location identifier group based on the location information in the database of the CLF, and binds the location identifier or location identifier group with the location information, and sends the binding result to the verification node.

Step 416, the verification node determines the location of the H(e)NB according to the location identifier or location identifier group of the location information registered by the network management centre in the database of the CLF, and the verification node will register this new location of the H(e)NB, and the network permits the service access of the H(e)NB based on this new location information, and locking the new location of the H(e)NB succeeds.

The present example further provides a verification node for giving support to locking a location of a user network device, which comprises:

a location information receiving module, which is configured to: receive location information sent by the user network device to said verification node after said user network device obtains said location information;

a comparing module, which is configured to: compare said location information received by said location information receiving module with various location identifiers corresponding to the location information stored in said comparing module and/or corresponding location identifiers inquired from a Connectivity Session Location and Repository Function (CLF) storing various location identifiers corresponding to the location information, and determine whether to register the location information of the user network device according to a comparison and/or inquiry result;

wherein said user network device includes a Home NodeB (HNB) or a Home evolved NodeB (HeNB).

The comparing module is configured to store various location identifiers corresponding to the location information in a following way:

directly storing the various location identifiers corresponding to the location information in said comparing module; or storing a location identifier group in said comparing module after binding the various location identifiers corresponding to the location information of the same location as the location identifier group.

The comparing module is configured to compare said location information received by said location information receiving module with various location identifiers corresponding to the location information stored in said comparing module and/or corresponding location identifiers inquired from a Connectivity Session Location and Repository Function (CLF) storing various location identifiers corresponding to the location information, and determine whether to register the location information of the user network device according to a comparison and/or inquiry result in a following way:

when both of the verification node and CLF store the location identifier of said user network device, said comparing module compares received location information with various location identifiers or the location identifier group stored in the verification node, and if the received location information is all able to match the corresponding location identifier in said verification node, then comparison succeeds and said comparing module determines not to register the location information of said user network device; if the received location information is not all able to match the corresponding location identifier in said verification node, then comparison fails and said comparing module sends a request for inquiring the corresponding location identifier to the CLF; or when only the verification node stores the location identifier of said user network device, said comparing module compares received location information with various location identifiers or the location identifier group stored in the verification node, and if the received location information is all able to match the corresponding location identifier in said verification node, then comparison succeeds and said comparing module determines not to register the location information of said user network device; if the received location information is not all able to match the corresponding location identifier in said verification node, then comparison fails and said comparing module refuses the service access of said user network device; or when only the CLF stores the location identifier of said user network device, said comparing module directly sends the request for inquiring the corresponding location identifier to the CLF according to the received location information, so that the CLF searches its own database, and inquires the location identifier or location identifier group corresponding to said location information, and if the corresponding location identifier or location identifier group exists in said database, then send the inquired location identifier or location identifier group to said verification node, and said verification node re-registers new location information of said user network device according to the received location identifier or location identifier group; if the corresponding location information does not exist in said database, then send said location information to a network management centre; and said network management centre checks whether said location information is available, and if it is unavailable, refuses the service access of said user network device; if it is available, then registers the location identifier or location identifier group based on said location information in the database of said CLF, and sends it to the verification node after binding the location identifier or location identifier group with said the location information.

The comparing module is further configured to: executes cancellation or deletion of the current location identifier or location identifier group of the user network device when the comparison of said verification node fails.

The comparing module is further configured to: cancel or delete the current location identifier or location identifier group of said user network device when said verification node learns that the location information of said user network device varies.

Figure 5:
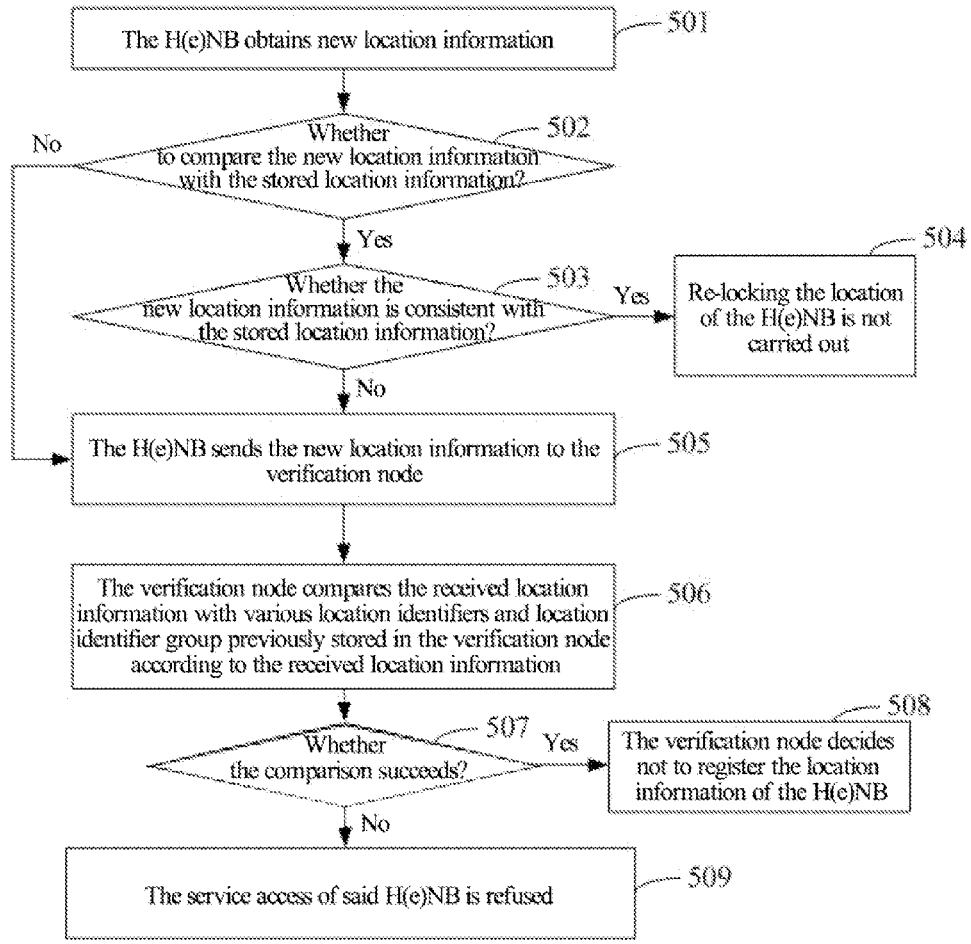
FIG. 5 is a flow chart of the method for locking the location of the H(e)NB when the verification node stores the location identifier of the H(e)NB according to the present invention.

Based on the above core concept of the present invention, below it will describe the specific operations of locking the location of the H(e)NB in detail. As shown in FIG. 5, this figure shows a flow of locking the location of the H(e)NB when only the verification node stores the location identifier of the H(e)NB, and specifically comprises following steps:

Step 501, the H(e)NB obtains new location information.

Step 502, the H(e)NB chooses whether to compare the new location information with the current stored location information, and if yes, execute the step 503; if no, execute the step 505.

Step 503, the H(e)NB compares whether the new location information is consistent with the current stored location information, and if the result is the consistent, then execute the step 504; and if the result is the inconsistent, then execute the step 505.

Said inconsistency of location information includes: the new location information inconsistent with the current stored location information which is caused by the location of the H(e)NB varying, and it also includes: the new location information inconsistent with the current stored location information which is caused by the type of the location information varying but the location of the H(e)NB not varying. Said the type of the location information varying is for example: the location information varies from the previous type of the IP address to the current type of the Macro Cell address.

Step 504, re-locking the location of the H(e)NB is not carried out, ending.

Step 505, the H(e)NB sends the new location information to the verification node.

Steps 506~507, the verification node compares the received location information with various location identifiers and the location identifier group previously stored in the verification node according to the received location information, and if the received location information is all able to match the corresponding location identifier in the verification node, execute the step 508; if the received location information is not all able to match the corresponding location identifier in the verification node, execute the step 509.

Step 508, the location information received by the verification node is all able to match the corresponding location identifier in the location identifiers or location identifier group stored in the verification node itself, and then the comparison succeeds, and it denotes that the location of the H(e)NB does not vary, and the verification node decides not to register the location information of the H(e)NB, ending.

Step 509, comparison fails, and the service access of said H(e)NB is refused.

Figure 6:
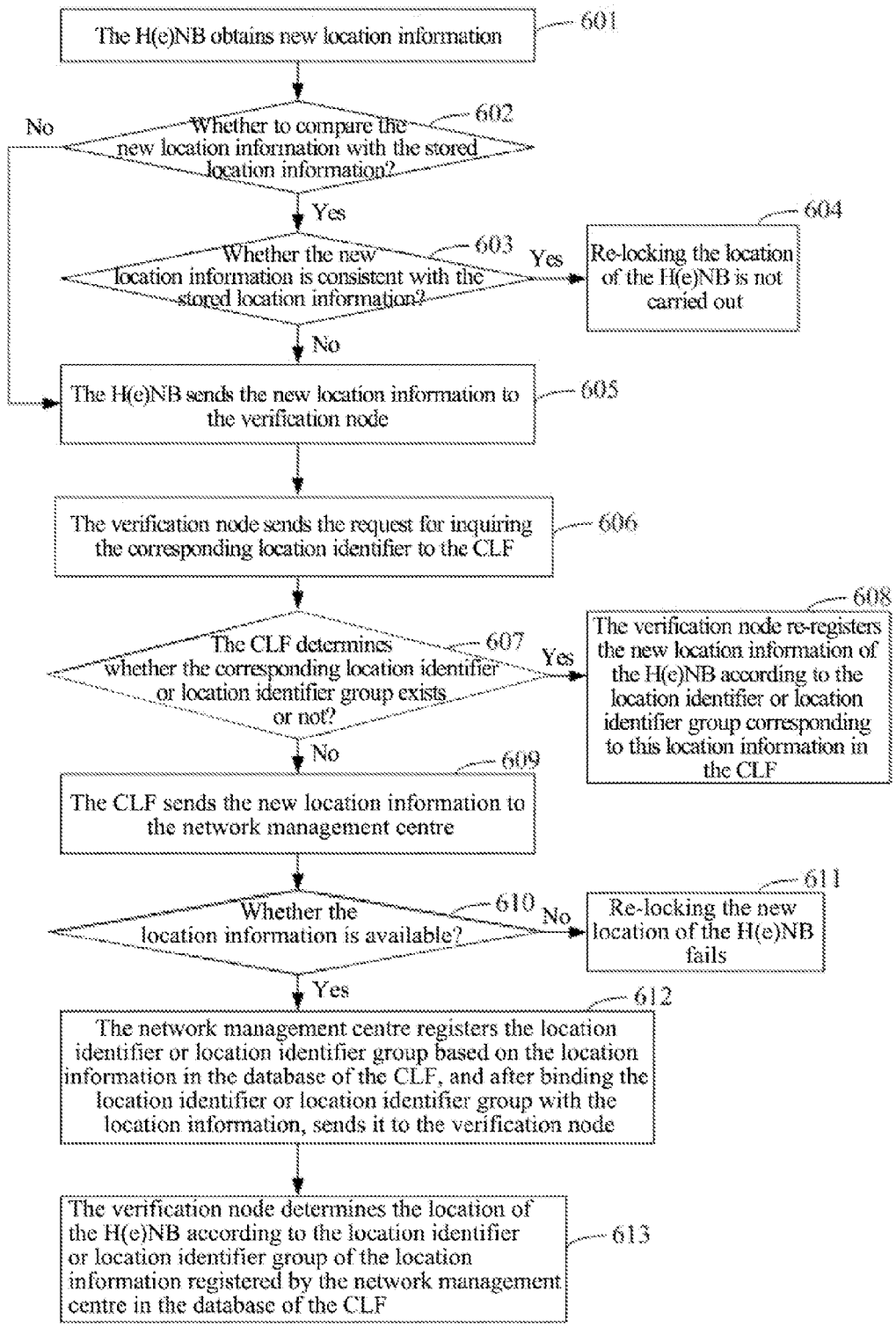
FIG. 6 is a flow chart of the method for locking the location of the H(e)NB when the CLF stores the location identifier of the H(e)NB according to the present invention.

Base on the above core concept of the present invention, below it will describe another kind of specific operations of locking the location of the H(e)NB in detail. As shown in FIG. 6, this figure shows a flow of locking the location of the H(e)NB when only the CLF stores the location identifier of the H(e)NB, and specifically comprises following steps:

Step 601, the H(e)NB obtains new location information.

Step 602, the H(e)NB chooses whether to compare the new location information with the current stored location information, and if yes, execute the step 603; if no, execute the step 605.

Step 603, the H(e)NB compares whether the new location information is consistent with the current stored location information, and if the result is the consistent, then execute the step 604; and if the result is the inconsistent, then execute the step 605.

Said inconsistency of location information includes: the new location information inconsistent with the current stored location information which is caused by the location of the H(e)NB varying, and it also includes: the new location information inconsistent with the current stored location information which is caused by the type of the location information varying but the location of the H(e)NB not varying. Said the type of the location information varying is for example: the location information varies from the previous type of the IP address to the current type of the Macro Cell address.

Step 604, re-locking the location of the H(e)NB is not carried out, ending.

Step 605, the H(e)NB sends the new location information to the verification node.

Step 606, the verification node sends the request for inquiring the corresponding location identifier to the CLF.

Step 607, the CLF searches its database, and inquires the location identifier or location identifier group corresponding to the received location information, and if the search result is existing, step 608 is carried out, or else, step 609 is carried out.

Step 608, the CLF sends the searched location identifier or location identifier group to the verification node, the verification node re-registers the new location information of the H(e)NB according to the received location identifier or location identifier group, and the network permits the service access of the H(e)NB based on this new location information, and locking the new location of the H(e)NB succeeds, ending.

Step 609, the CLF sends the location information to the network management centre.

Step 610, the network management centre checks whether the location information is available after receiving the location information, and if unavailable, then execute step 611; if available, then execute step 612;

Step 611, the network management centre refuses the service access of the H(e)NB based on the location information, and sends the refusal reason to the H(e)NB, and locking the new location of the H(e)NB fails, ending.

Step 612, the network management centre registers the location identifier or location identifier group based on the location information in the database of the CLF, and binds the location information with the location identifiers or location identifier group, and sends the binding result to the verification node.

Step 613, the verification node determines the location of the H(e)NB according to the location identifier or location identifier group of the location information registered by the network management centre in the database of the CLF, and the verification node will register this new location of the H(e)NB, and the network permits the service access of the H(e)NB based on this new location information, and locking the new location of the H(e)NB succeeds.

Besides, when the comparison fails, the verification node also can execute the cancellation or deletion of the current location identifiers or location identifier group of the H(e)NB. For example, the new location information obtained by the H(e)NB includes A, B and C, then the verification node compares A, B and C with the location identifier or location identifier group stored by itself according to A, B and C, and if location information A and B are all able to match the corresponding location identifiers in the verification node successfully, but the location information C is unable to match the corresponding location identifier in the verification node, then the verification node sends the request for inquiring the location identifier corresponding to the location information C to the CLF. If this location identifier group stored by the verification node further includes the location identifier D, then the verification node cancels or deletes the location identifier D.

The above description is only the more preferable examples of the present invention, but is not used for limiting the protection scope of the present invention.

INDUSTRIAL APPLICABILITY

The present invention implements to lock the location of the H(e)NB when the H(e)NB moves, which increases the reliability of locking the location of the H(e)NB and the locking success probability, and solves various inconveniences and threats caused by the location of the H(e)NB being moved.

What is claimed is:

1. A method for locking a location of a user network device, this method comprising:
   a Connectivity Session Location and Repository Function (CLF) and/or a verification node storing various location identifiers corresponding to location information;
   when the user network device obtains the location information, sending said location information to the verification node; and
   said verification node comparing received location information with the various location identifiers stored in the verification node and/or corresponding location identifiers inquired from the CLF, and determining whether to register the location information of said user network device according to a comparison and/or inquiry result; in following ways:
   when both of the verification node and CLF store the location identifier of said user network device, said verification node comparing the received location information with the various location identifiers or the location identifier group stored in the verification node, and if all the received location information are able to match to the corresponding location identifier in said verification node, then comparison succeeding and determining not to register the location information of the user network device; if not all the received location information are able to match the corresponding location identifier in said verification node, then comparison failing and sending a request for inquiring the corresponding location identifier to the CLF;
   said CLF searching a database of CLF's own, inquiring the location identifier or location identifier group corresponding to said location information, and when the corresponding location identifier or location identifier group exists in said database, then sending an inquired location identifier or location identifier group to said verification node, and said verification node re-registering new location information of said user network device according to a received location identifier or location identifier group;
   when only the verification node stores the location identifier of said user network device, said verification node comparing the received location information with the various location identifiers or location identifier group stored in the verification node, and if all the received location information are able to match the corresponding location identifier in said verification node, then comparison succeeding and determining not to register the location information of said user network device; if not all the received location information are able to match the corresponding location identifier in said verification node, then the comparison failing and refusing service access of said user network device;
   when only the CLF stores the location identifier of said user network device, said verification node directly sending the request for inquiring the corresponding location identifier to the CLF according to the received location information;
   the CLF searching the database of CLF's own, inquiring the location identifier or location identifier group corresponding to said location information, and when the corresponding location identifier or location identifier group exists in said database, sending the inquired location identifier or location identifier group to said verification node, and said verification node re-registering new location information of said user network device according to the received location identifier or location identifier group;
   wherein said user network device includes a Home NodeB (FINE) or a Home evolved Home NodeB (HeNB).

2. The method as claimed in claim 1, wherein said step of storing the various location identifiers corresponding to the location information comprises:
   directly storing the various location identifiers corresponding to the location information in said CLF and/or verification node; or
   storing the location identifier group in said CLF and/or verification node after binding the various location identifiers corresponding to the location information of a same location as the location identifier group.

3. The method as claimed in claim 1, wherein said step of sending the location information to the verification node when the user network device obtains the location information comprises:
   when said user network device initially obtains the location information, directly sending obtained location information to the verification node; or
   when said user network device re-obtains new location information, comparing said new location information with currently stored location information, and if both are consistent, not required to send the obtained location information to the verification node; if both are inconsistent, sending said new location information to the verification node.

4. The method as claimed in claim 1, wherein
   when both of the verification node and CLF store the location identifier of said user network device,
   and the corresponding location information does not exist in said database, then sending said location information to a network management centre; and
   said network management centre checking whether said location information is available, and if said location information is unavailable, refusing service access of said user network device; if said location information is available, then registering the location identifier or location identifier group based on said location information in the database of said CLF, and sending a binding result to the verification node after binding said location information with the location identifier or the location identifier group.

5. The method as claimed in claim 1, wherein
when only the CLF stores the location identifier of said user network device,
and the corresponding location information does not exist in said database, then sending said location information to a network management centre; and
said network management centre checking whether said location information is available, and if said location information is unavailable, refusing service access of said user network device; if said location information is available, then registering the location identifier or location identifier group based on said location information in the database of said CLF, and sending a binding result to the verification node after binding said location information with the location identifier or location identifier group.

6. The method as claimed in claim 1, wherein this method further comprises: when comparison of said verification node fails, said verification node cancelling or deleting a current location identifier or location identifier group of the user network device.

7. The method as claimed in claim 2, wherein before the step of said user network device sending the location information to the verification node, this method further comprises: said verification node learning that the location information of the user network device varies, cancelling or deleting a current location identifier or location identifier group of the user network device.

8. The method as claimed in claim 1, wherein
said verification node is a user network device management system and/or a user network device gateway; said user network device management system includes a Home NodeB Management System (HMS) or a Home evolved NodeB Management System (HeMS); and said user network device gateway includes a Home NodeB Gateway (HNB-GW) or a Home evolved NodeB Gateway (HeNB-GW).

9. The method as claimed in claim 2, wherein said step of sending the location information to the verification node when the user network device obtains the location information comprises:
when said user network device initially obtains the location information, directly sending obtained location information to the verification node; or
when said user network device re-obtains new location information, comparing said new location information with currently stored location information, and if both are consistent, not required to send the obtained location information to the verification node; if both are inconsistent, sending said new location information to the verification node.

10. The method as claimed in claim 2, wherein
when only the CLF stores the location identifier of said user network device,
and the corresponding location information does not exist in said database, then sending said location information to a network management centre; and
said network management centre checking whether said location information is available, and if said location information is unavailable, refusing service access of said user network device; if said location information is available, then registering the location identifier or location identifier group based on said location information in the database of said CLF, and sending a binding result to the verification node after binding said location information with the location identifier or location identifier group.

11. The method as claimed in claim 2, wherein
said verification node is a user network device management system and/or a user network device gateway; said user network device management system includes a Home NodeB Management System (HMS) or a Home evolved NodeB Management System (HeMS); and said user network device gateway includes a Home NodeB Gateway (HNB-GW) or a Home evolved NodeB Gateway (HeNB-GW).

12. A verification node for giving support to locking a location of a user network device, which comprises:
a location information receiving module, which is configured to: receive location information sent by the user network device to the verification node after the user network device obtains said location information; and
a comparing module, which is configured to: compare said location information received by said location information receiving module with various location identifiers corresponding to said location information stored in the comparing module and/or corresponding location identifiers inquired from a Connectivity Session Location and Repository Function (CLF) which stores the various location identifiers corresponding to the location information, and determine whether to register the location information of said user network device according to a comparison and/or inquiry result;
wherein said comparing module is configured to compare said location information received by said location information receiving module with the various location identifier corresponding to said location information stored in the comparing module and/or the corresponding location identifiers inquired from the Connectivity Session Location and Repository Function (CLF) which stores the various location identifiers corresponding to the location information, and determine whether to register the location information of said user network device according to the comparison and/or inquiry result in following ways:
when both of the verification node and the CLF store the location identifier of said user network device, said comparing module comparing received location information with the various location identifiers or location identifier group stored in the verification node, and if all the received location information are able to match to the corresponding location identifier in said verification node, then comparison succeeding and determining not to register the location information of the user network device; if not all the received location information are able to match to the corresponding location identifier in said verification node, then comparison failing and sending a request for inquiring the corresponding location identifier to the CLF; or
when only the verification node stores the location identifier of said user network device, said comparing module comparing the received location information with the various location identifiers or the location identifier group stored in the verification node, and if all the received location information are able to match to the corresponding location identifier in said verification node, then the comparison succeeding and determining not to register the location information of said user network device; if not all the received location information are able to match to the corresponding location identifier in said verification node, then the comparison failing and refusing service access of said user network device; or
when only the CLF stores the location identifier of said user network device, said comparing module directly sending the request for inquiring the corresponding location identifier to the CLF according to the received location information so that said CLF searches a database of CLF's own, and inquires the location identifier or location identifier group corresponding to said location information, and when the corresponding location identifier or location identifier group exists in said database, sending an inquired location identifier or location identifier group to said verification node, and said verification node re-registering new location information of said user network device according to a received location identifier or location identifier group;

wherein said user network device includes a Home NodeB (HNB) or a Home evolved Home NodeB (HeNB).

13. The verification node as claimed in claim 12, wherein said comparing module is configured to store the various location identifiers corresponding to the location information in a following way:

directly storing the various location identifiers corresponding to the location information in said comparing module; or storing a location identifier group in said comparing module after binding the various location identifiers corresponding to the location information of a same location as the location identifier group.

14. The verification node as claimed in claim 12, wherein said comparing module is configured to when only the CLF stores the location identifier of said user network device, and the corresponding location information does not exist in said database, then sending said location information to a network management centre; and said network management centre checking whether said location information is available, and if said location information is unavailable, refusing the service access of said user network device; if said location information is available, then registering the location identifier or location identifier group based on said location information in the database of said CLF, and sending a binding result to the verification node after binding said location information with the location identifier or location identifier group.

15. The verification node as claimed in claim 12, wherein said comparing module is further configured to: cancel or delete a current location identifier or location identifier group of the user network device when the comparison of said verification node fails.

16. The verification node as claimed in claim 12, wherein said comparing module is further configured to: cancel or delete a current location identifier or location identifier group of the user network device when said verification node learns that the location information of the user network device varies.

17. The verification node as claimed in claim 13, wherein said comparing module is configured to when only the CLF stores the location identifier of said user network device, and the corresponding location information does not exist in said database, then sending said location information to a network management centre; and said network management centre checking whether said location information is available, and if said location information is unavailable, refusing the service access of said user network device; if said location information is available, then registering the location identifier or location identifier group based on said location information in the database of said CLF, and sending a binding result to the verification node after binding said location information with the location identifier or location identifier group.

* * * * *